United States Patent
Na et al.

(10) Patent No.: US 8,379,762 B2
(45) Date of Patent: Feb. 19, 2013

(54) PHYSICAL CARRIER TO INTERFERENCE-PLUS-NOISE RATIO TECHNIQUES FOR WIDEBAND WIRELESS COMMUNICATION NETWORKS

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1170 days.

(21) Appl. No.: 12/164,718

(22) Filed: Jun. 30, 2008

(65) Prior Publication Data

US 2009/0022254 A1 Jan. 22, 2009

Related U.S. Application Data

(60) Provisional application No. 60/950,862, filed on Jul. 19, 2007.

(51) Int. Cl.
*H04L 27/00* (2006.01)
(52) U.S. Cl. .......................................... 375/316; 375/260
(58) Field of Classification Search .................. 375/267, 375/285, 316–352
See application file for complete search history.

(56) References Cited

U.S. PATENT DOCUMENTS

| | | | | |
|---|---|---|---|---|
| 5,991,273 A * | 11/1999 | Abu-Dayya | ................... | 375/347 |
| 6,535,501 B1 * | 3/2003 | Bohnke | .......................... | 370/345 |
| 7,369,531 B2 * | 5/2008 | Cho et al. | ....................... | 370/343 |
| 7,477,699 B2 * | 1/2009 | Wang et al. | .................... | 375/267 |
| 7,590,171 B2 * | 9/2009 | Chang et al. | .................. | 375/260 |
| 7,606,299 B2 * | 10/2009 | Chang et al. | .................. | 375/346 |
| 2005/0265489 A1 | 12/2005 | Chang et al. | | |
| 2006/0154633 A1 | 7/2006 | Wang | | |
| 2007/0036064 A1 | 2/2007 | Song et al. | | |
| 2008/0240217 A1 | 10/2008 | Lee et al. | | |

FOREIGN PATENT DOCUMENTS

| | | |
|---|---|---|
| EP | 1855405 A1 | 11/2007 |
| WO | 2007021159 A2 | 2/2007 |
| WO | 2007078086 A1 | 7/2007 |
| WO | 2007078099 A1 | 7/2007 |
| WO | 2007149610 A2 | 12/2007 |
| WO | 2008005073 A1 | 1/2008 |

OTHER PUBLICATIONS

International Search Report and Written Opinion dated Mar. 4, 2009 cited in PCT/US2008/070271.

* cited by examiner

*Primary Examiner* — Sam K Ahn
*Assistant Examiner* — Janice Tieu
(74) *Attorney, Agent, or Firm* — Edell, Shapiro & Finnan, LLC

(57) ABSTRACT

Techniques are provided to compute the physical carrier to interference-plus-noise ratio (PCINR) in a wireless communication system. In one embodiment, the PCINR is computed from received signals in active subcarriers in a preamble of a wireless transmission frame. In another embodiment, the PCINR is computed from a block of contiguous subcarriers in a symbol of received wireless transmission. The PCINR may be used to adjust a system parameter associated with wireless communication between wireless communication devices.

24 Claims, 7 Drawing Sheets

PHYSICAL CARRIER TO INTERFERENCE-PLUS-NOISE RATIO TECHNIQUES FOR WIDEBAND WIRELESS COMMUNICATION NETWORKS

CROSS REFERENCE TO RELATED APPLICATION

This application claims priority to U.S. Provisional Patent Application No. 60/950,862, filed Jul. 19, 2007, the entirety of which is incorporated herein by reference.

BACKGROUND

In a wireless communication system, one challenge is to provide high data rate wireless access with a high quality of service. The physical carrier to interference-plus-noise ratio (PCINR) is a measurement of the ratio of average desired signal to average interference-plus-noise, as measured on a received signal. The PCINR should represent actual channel/operation conditions as truthfully as possible and so that system parameter adjustments may be made based on meaningful measurements.

A technique for accurately computing the PCINR in wideband wireless communication system would be useful for making adjustments in wireless communication system parameters.

DETAILED DESCRIPTION

Overview

Techniques are provided herein for computing the physical carrier to interference-plus-noise ratio (PCINR). In one embodiment, for each received wireless transmission frame, data is stored that represents a first vector for received signals in active subcarriers. A preamble for the frame is detected and data is stored representing a second vector for a code in the active subcarriers. An estimate of a sum of signal power and interference-plus-noise power is computed from the first and second vectors, and an estimate of the signal power is computed from the first and second vectors. Thus, an estimate of the interference-plus-noise power is computed from the sum and from the estimate of the signal power. The PCINIR is then computed from the estimate of the signal power and the estimate of the interference-plus-noise power. In another embodiment, wireless transmissions are received that include pilot signals in subcarriers. For each block of contiguous subcarriers in a symbol, data is stored representing the received pilot signals in subcarriers. An estimate of a sum of estimated signal power and estimated interference-plus-noise power is computed from the received pilot signals. A difference is computed between received pilot signals in adjacent subcarriers and symbols. An estimate of the interference-plus-noise power is computed from the difference and an estimate of the signal power is computed from the sum and from the estimate of the interference-plus-noise power. The PCINIR is then computed from the estimate of the signal power and the estimate of the interference-plus-noise power. The PCINR computed according to the any of the embodiments described herein may be used to adjust a system parameter associated with wireless communication between wireless communication devices.

Figure 1:
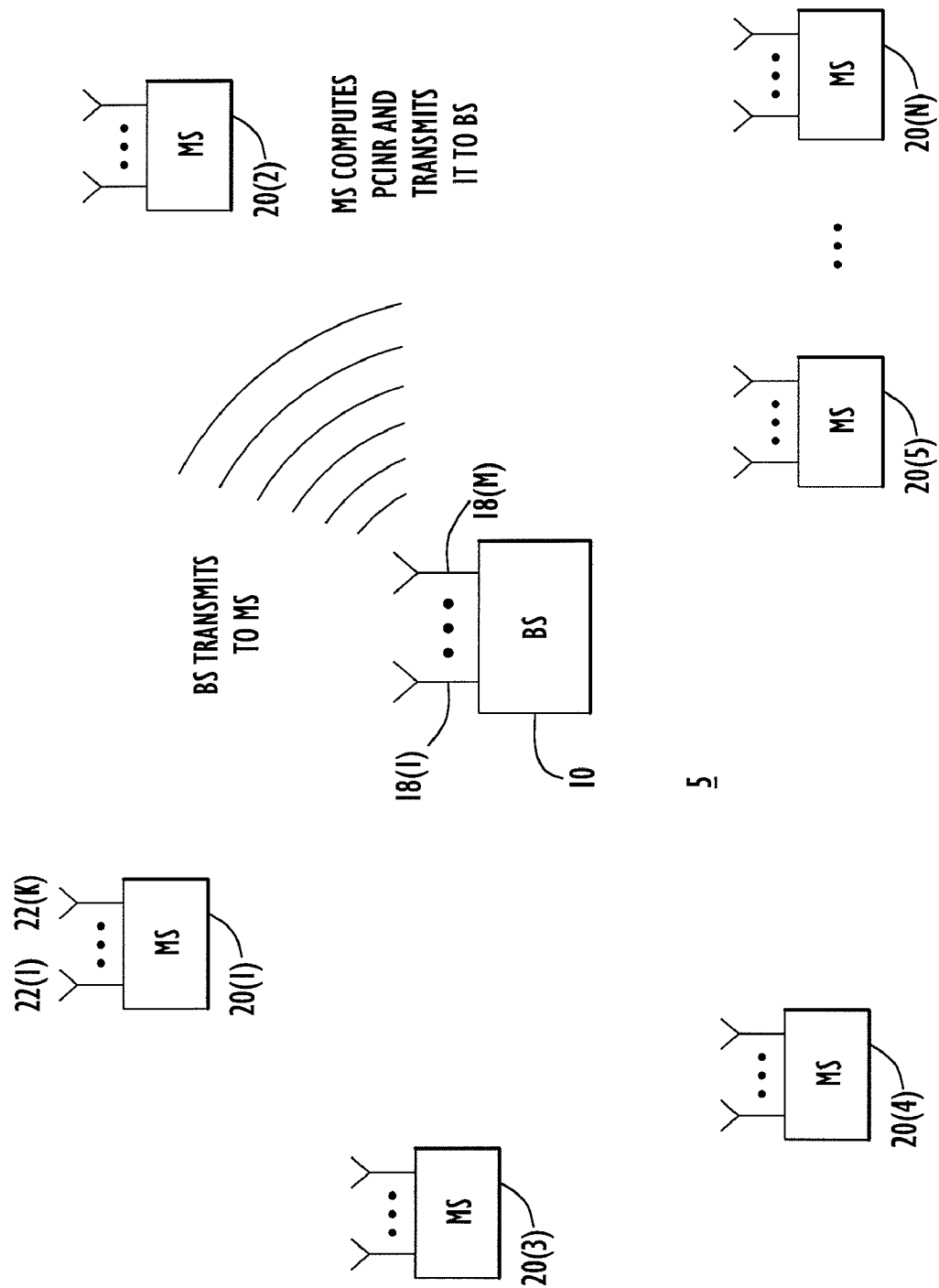
FIG. 1 is an example of a block diagram of a wireless communication system in which a base station wireless communicates with mobile stations using a wideband communication protocol.

Referring first to FIG. 1, a wireless radio communication system or network is shown generally at reference numeral 5 and comprises a first communication device, e.g., a base station (BS) 10, and a plurality of second communication devices, e.g., mobile stations (MS's) 20(1)-20(N). The BS 10 may connect to other wired data network facilities (not shown) and in that sense serves as a gateway or access point through which the MS's 20(1)-20(N) have access to those data network facilities.

The BS 10 comprises a plurality of antennas **18(1)-18(*m*) and the MS's 20(1)-20(N) may also comprise a plurality of antennas 22(1)-22(K). The BS 10 may wirelessly communicate with individual ones of the MS's 20(1)-20(N)** using a wideband wireless communication protocol in which the bandwidth is much larger than the coherent frequency bandwidth. An example of such a wireless communication protocol is the IEEE 802.16 communication standard, also known commercially as WiMAX™.

Techniques are provided herein to enable either device on a wireless communication link (e.g., a BS or an MS) to compute the PCINR based on signals that one wireless device received from the other wireless device. For example, as depicted in FIG. 1, the BS 10 transmits a signal to a particular MS, e.g., MS 20(2). The MS 20(2) computes the PCINR based on the signals it receives from the BS. The MS 20(2) may then transmit the PCINR it computed back to the BS 10. The BS 10 may use the PCINR that the MS 20(2) computed to adjust one or more system parameters associated with future wireless transmissions to the MS 20(2), such as estimating effective CINR values, aiding cross-layer schedule design for assigning users (MS's) to specific subchannels for better throughput performance, selection of modulation and coding modes, and selection of transmission modes among a plurality of transmissions modes including, for example, space time code (STC), multiple-input multiple-output (MIMO), selection of Partial Usage of Subchannels (PUSC) or Adaptive Modulation and Coding (AMC) zones transmission modes (e.g., in a WiMAX communication system), calculating the beamforming weights for uplink transmission, adjusting preceding parameters for downlink transmission. Similarly, the BS 10 may compute the PCINR based on signals it receives from a particular MS, e.g. MS 20(2).

Figure 2:
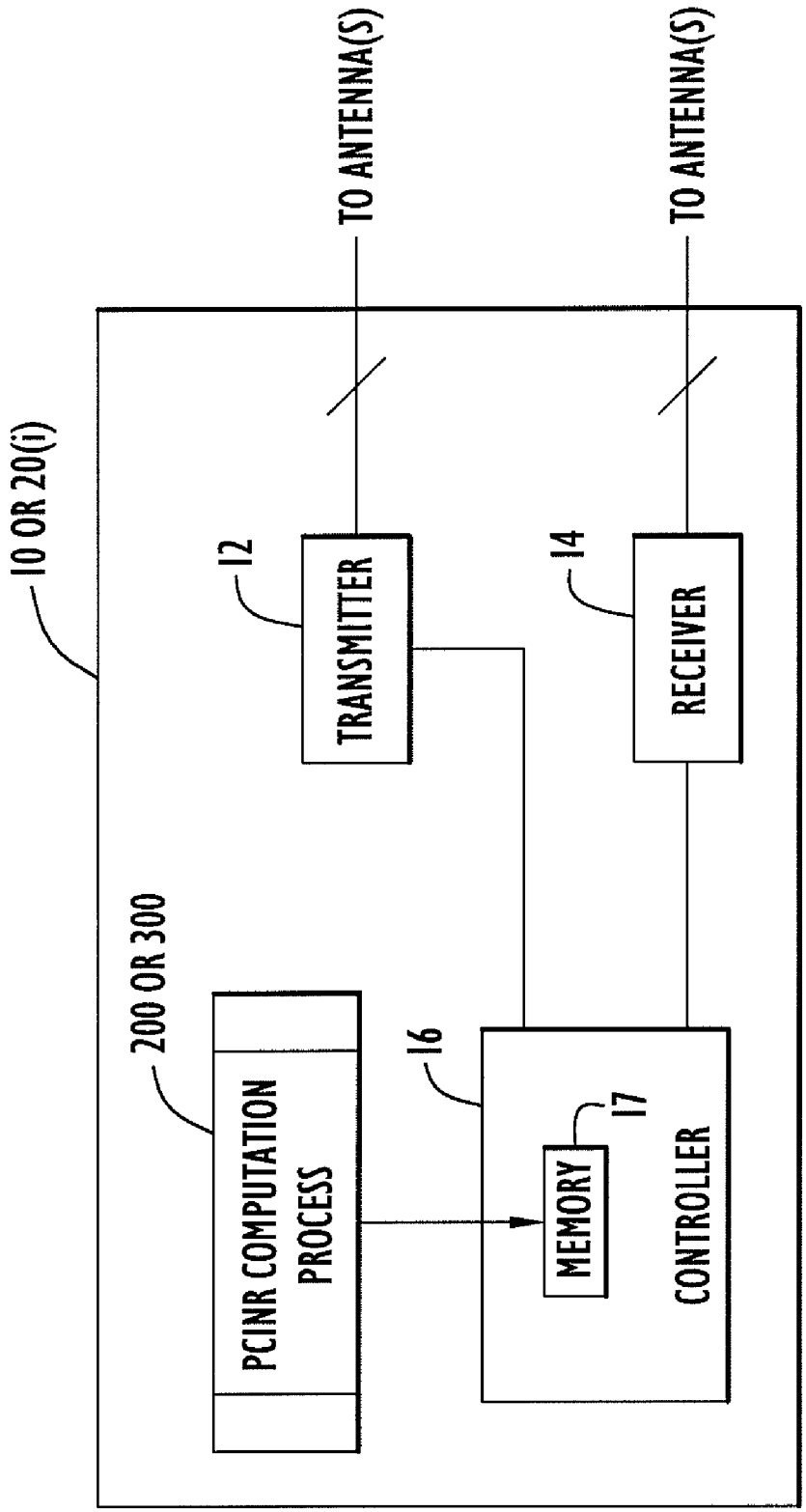
FIG. 2 is an example of a block diagram of a wireless communication device (base station or mobile station) that is configured to compute the physical carrier to interference-plus-noise ratio.

Turning to FIG. 2, an example of a block diagram is shown that there is a wireless communication device that may serve as a BS 10 or an MS 20(i) for purposes of describing the PCINR computation techniques. The wireless communication device (BS 10 or MS 20(i)) comprises a transmitter 12, a receiver 14 and a controller 16. The controller 16 supplies the data to the transmitter 12 to be transmitted and processes signals received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The transmitter 12 may comprise individual transmitter circuits that supply respective upconverted signals to corresponding ones of a plurality of antennas (antennas 18(1)-18(M) in the case of the BS 10 or antennas 20(1)-20(K) in the case of a MS) for transmission. The receiver 14 receives the signals detected by each of the antennas 18(1)-18(M) and supplies corresponding antenna-specific receive signals to controller 16. It is understood that the receiver 14 may comprise a plurality of receiver circuits, each for a corresponding one of a plurality of antennas. For simplicity, these individual receiver circuits and individual transmitter circuits are not shown. The controller 16 comprises a memory 17 or other data storage block that stores data used for the techniques described herein. The memory 17 may be separate or part of the controller 16. Instructions for performing a PCINR computation process 200 and 300 may be stored in the memory 17 for execution by the controller 16.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the PCINIR computation process 200 and 300 may be implemented with fixed logic or programmable logic (e.g., software/computer instructions executed by a processor). The PCINR computation processes 200 and 300 are described in detail hereinafter in conjunction with FIGS. 5 and 6, respectively.

The techniques described herein are applicable to any wireless communication system that employs a multi-carrier scheme, such as orthogonal frequency division multiple access (OFDMA), which is used in WiMAX systems. Based on an assumption that the frequency offset is small (<100 Hz), PCINR may be defined, for example, according to the definition of PCINR in the IEEE 802.16e communication standard. In the following, the CINR measurement is defined for a case where the frequency reuse factor (N) is 3, as an example.

First, the received signal r(k,m) in frequency domain may be written as r(k,m)=s(k,m)+n(k,m)=h(k,m)*d(k,m)+n(k,m)=h(k,m)*P(k)*c(k,m)+n(k,m) where k is the integer time index in frame units, m is the integer index of the subcarriers and $1 \leq m \leq L$ where L is the size of Fast Fourier Transform (FFT), h(k,m) is the channel coefficients (including the phase shift made by time error), d(k,m) is transmitted pilot sample as d(k,m)=P(k)*c(k,m), where P(k) is the power of signal and c(k,m) is the 0 or {-1, 1} pseudo-noise (PN) code, s(k,m) is the pilot sample with channel state weighting as s(k,m)=h(k,m)*d(k,m). In the above, notations are all scalars, *** denotes one variable, and noise n(k,m) is the complex value of interference plus thermal noise.

The quantity $\{i_y\}_{y=1}^{x}$ is denoted as the integer index of the active subcarriers in which c(k,m) is a 1 or −1 PN code, or the index of subcarriers in a segment (0th, 1st, or 2nd segment), where x is the total number of non-zero pilots and $1 \leq i_1 < i_2 < \Lambda < i_x \leq L$. The ideal PCINR in the kth frame as $\overline{CINR}(k)$, is:

$$\overline{CINR}(k) = \frac{\overline{P}_{signal}(k)}{\overline{P}_{noise}(k)} = \frac{\sum_{y=1}^{x} |s(k, i_y)|^2}{\sum_{y=1}^{x} |n(k, i_y)|^2}$$

where $\overline{P}_{signal}(k)$ is the ideal average desired signal power in active subcarriers in the kth frame, $\overline{P}_{noise}(k)$ is the ideal average power of (interference+noise) in active subcarriers in the kth frame, and |*| is the Euclidean norm operation.

The estimated PCINR in kth frame may be written as $\widehat{CINR}(k)$ $$\widehat{CINR}(k) = \frac{\hat{P}_{signal}(k)}{\hat{P}_{noise}(k)}$$

where $\hat{P}_{signal}(k)$ is the estimated signal power in active subcarriers in the kth frame and $\hat{P}_{noise}(k)$ is the estimated interference-plus-noise power in active subcarriers in the kth frame.

The mean CINR statistic (dB) $\hat{\mu}_{CINR,dB}(k)$ is derived from a multiplicity of single messages as $$\hat{\mu}_{CINR,dB}(k) = 10 \log(\hat{\mu}_{CINR}(k))$$

where $$\hat{\mu}_{CINR}(k) = \begin{cases} \widehat{CINR}(0) & k = 0 \\ (1 - \alpha_{avg})\hat{\mu}_{CINR}(k-1) + \alpha_{avg}\widehat{CINR}(k) & k > 0 \end{cases}$$

where $\alpha_{avg}$ is an averaging parameter specified by the BS. The default averaging parameter $\alpha_{avg}$ is 0.25, for example.

Figure 3:
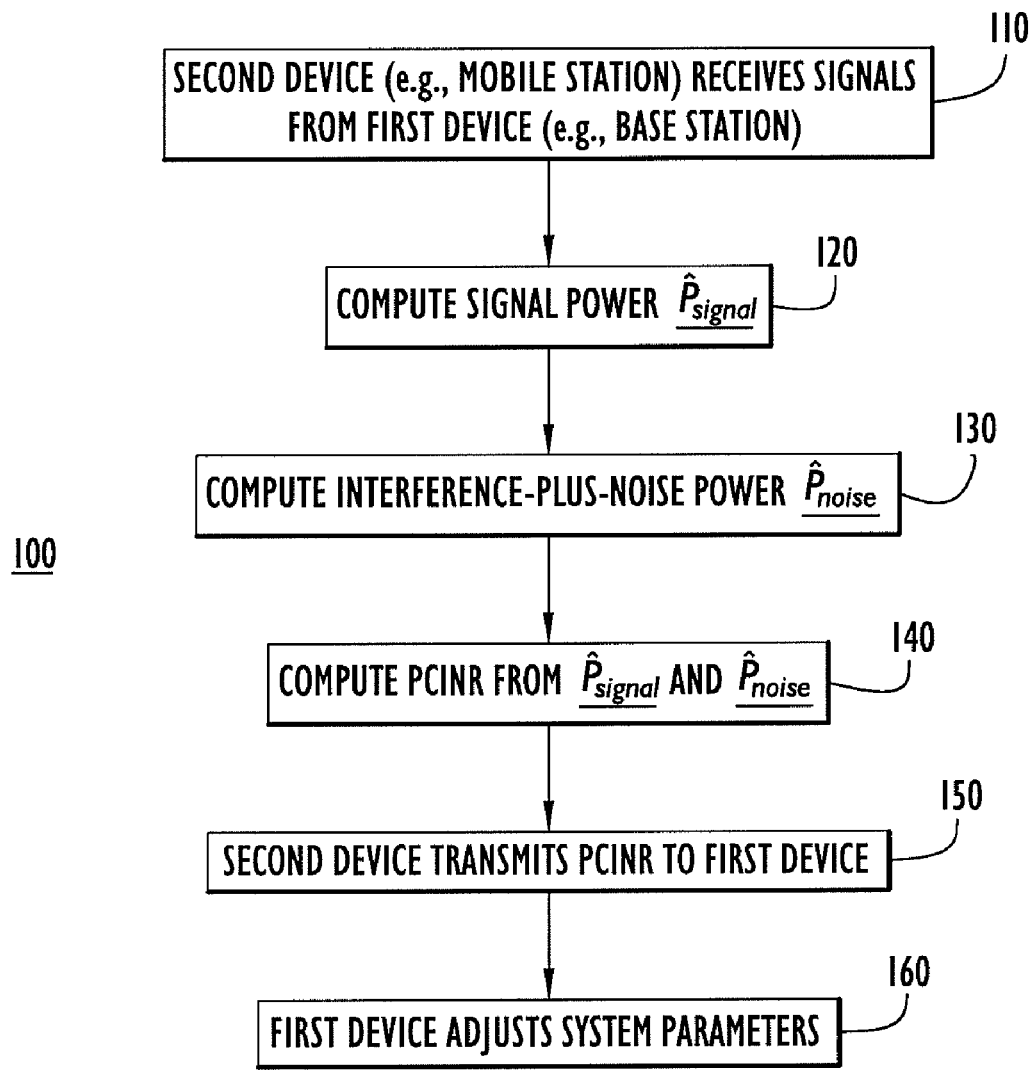
FIG. 3 is a flow chart generally depicting a process whereby a second device (e.g., a mobile station) computes the physical carrier to interference-plus-noise ratio based on signals received from a first device (e.g., base station) and transmits a signal carrying the physical carrier to interference-plus-noise ratio to the first device.

Turning now to FIG. 3, a flow chart is shown that depicts a process 100 by which a first device (e.g., BS 10) transmits signals to a second device (e.g., an MS), the second device computes the PCINR and transmits it back to the first device. The first device can then adjust one or more system parameters based on the PCINR computed by the second device. At 110, the second device receives signals from the first device. At 120, the second device computes the estimated signal power $\hat{P}_{signal}$ and at 130 the second device computes the estimated interference-plus-noise power $\hat{P}_{noise}$. At 140, the second device computes the PCINR from $\hat{P}_{signal}$ and $\hat{P}_{noise}$. At 150, the second device transmits the PCINTR to the first device. At 160, the first device, e.g., the BS 10, adjusts one or more system parameters based on the PCINR computed by the first device.

Figure 4:
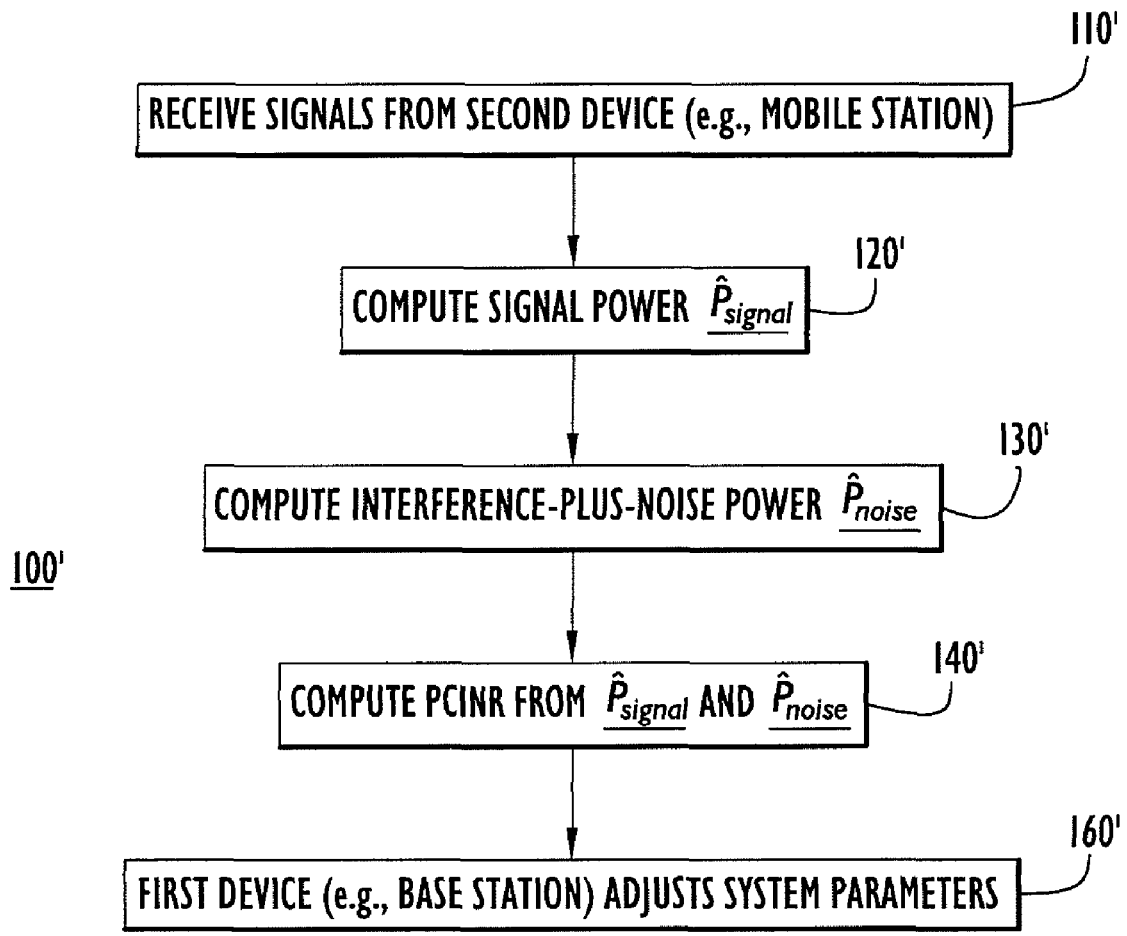
FIG. 4 is a flow chart generally depicting a process whereby a first device (e.g., a base station) computes the physical carrier to interference-plus-noise ratio based on signals it receives from a second device (e.g., a mobile station).

FIG. 4 illustrates a flow chart depicting a process 100' in which a first device (e.g., BS 10) computes the PCINR from signals which the first device receives from a second device (e.g., an MS). The process 100' is similar to process 100 shown in FIG. 3, except that there the PCINR is not transmitted from one device to another device in the process 100'. Thus, at 110', the first device receives signals from the second device. At 120', the first device computes the estimated signal power $\hat{P}_{signal}$ and at 130' the first device computes the estimated interference-plus-noise power $\hat{P}_{noise}$. Then, at 140', the first device computes the PCINR from the $\hat{P}_{signal}$ and $\hat{P}_{noise}$. At 160', the first device (e.g., BS 10) can adjust one or more system parameters.

Figure 5A:
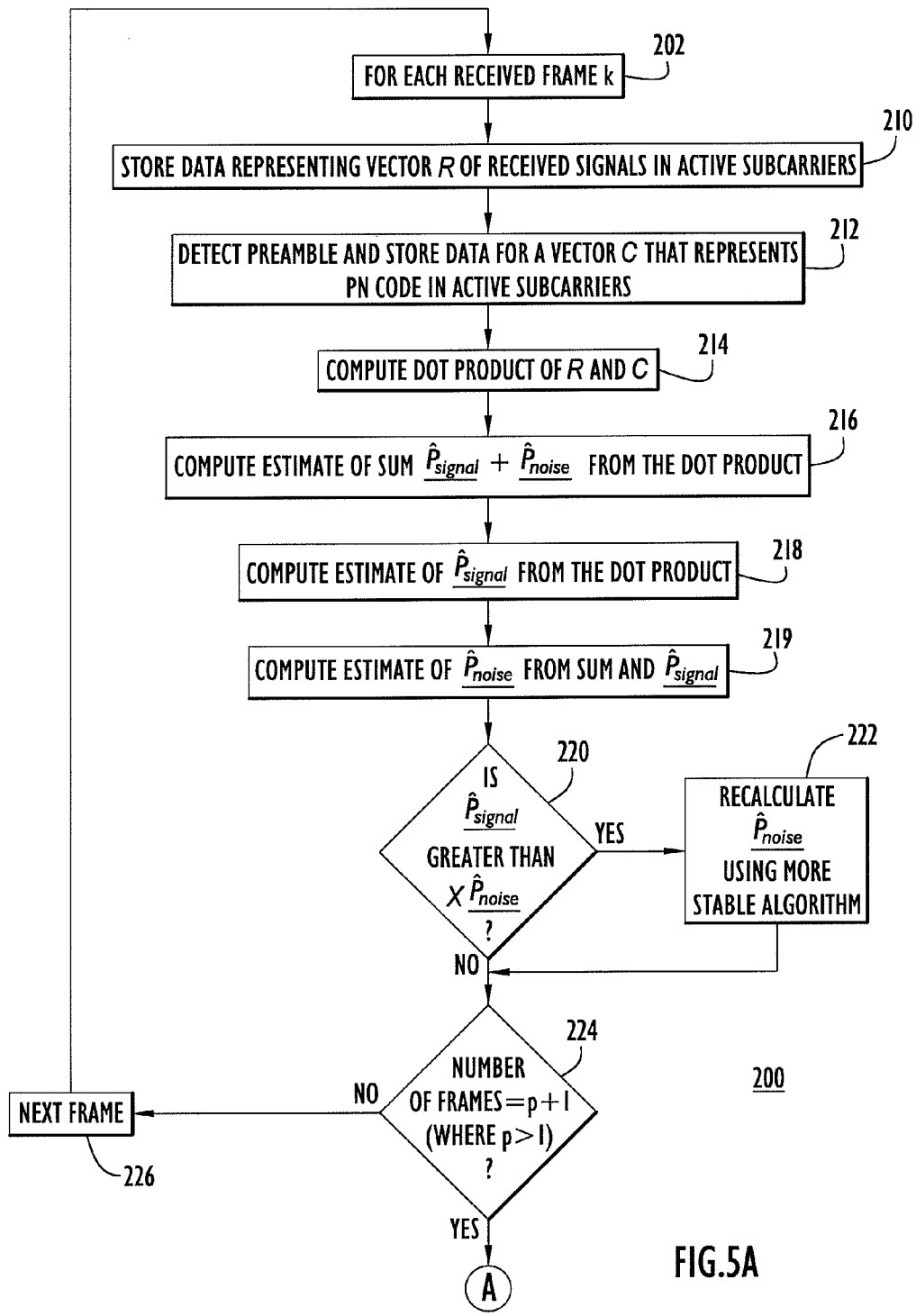
FIGS. 5A and 5B illustrate an example of a flow chart depicting a process for computing the physical carrier to interference-plus-noise ratio based on a preamble contained in received signal frames.
Figure 5B:
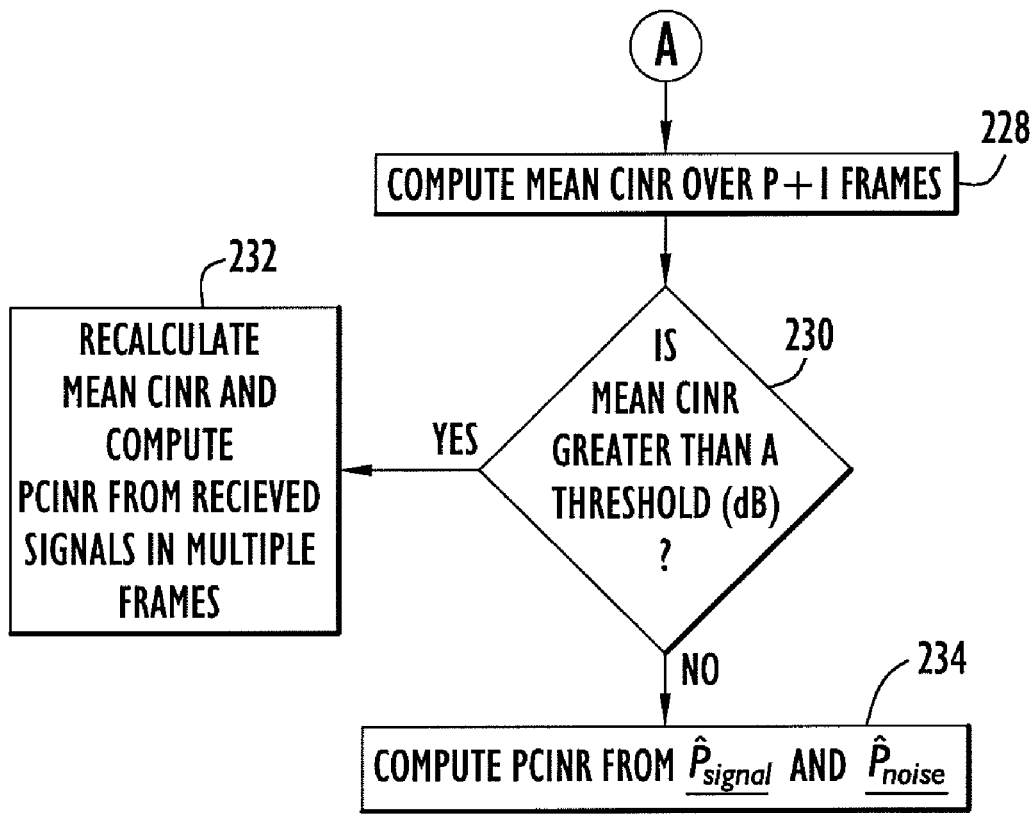

Turning now to FIGS. 5A and 5B, an example of a flow chart for the PCINR computation process 200 is now described. The process 200 uses information derived from a preamble of a signal received at a first device (e.g., a BS) from a second device (e.g., an MS). As indicated at 202, the functions associated with reference numerals 210-226 are performed for each frame of a received wireless transmission. A frame may be a signal interval as defined in the WiMAX communication standard, for example. At 210, data is stored that represents a first vector R of received signals in active subcarriers of a received frame, where R is defined as R=[$r(i_1),r(i_2),\Lambda,r(i_x)$], where $\{i_y\}_{y=1}^x$ is denoted as the integer index of the active subcarriers, x is the total number of non-zero pilots and $1<i_1<i_2<\Lambda<i_x<L$. The frame index k is ignored for purposes of the process 200. At 212, after the preamble of received frame is detected, data is stored for a second vector C that represents the PN code in the active subcarriers, where C=[$c(i_1),c(i_2),\Lambda,c(i_x)$]. Next, at 214, the dot product of the vectors R and C is computed, $\tilde{R}=R\oplus C=[r(i_1)*c(i_1),r(i_2)*c(i_2),\Lambda,r(i_x)*c(i_x)]$ where $\oplus$ is the dot product operation.

At 216, an estimate of the sum of the average signal power and average power of interference-plus-noise ($\hat{P}_{signal}+\hat{P}_{noise}$) is computed as follows:

$(\hat{P}_{signal}+\hat{P}_{noise})$ sum$((abs(R))^2)/x=$sum$((abs(\tilde{R}))^2)/x$, where abs means the absolute value operation and sum means the summation operation on all elements in the vector.

At 218, an estimate of the signal power is computed from the dot product as $\hat{P}_{signal}=abs(sum(\tilde{R}(1:x-1)\oplus conj(\tilde{R}(2:x))))/(x-1)$, where conj means the conjugate operation, abs means the absolute value operation and sum means the summation operation.

At 219, an estimate of the interference-plus-noise power is computed from the sum ($\hat{P}_{signal}+\hat{P}_{noise}$) and the estimate of the signal power $\hat{P}_{signal}$ since $\hat{P}_{noise}$ may be written as $\hat{P}_{noise}=(\hat{P}_{signal}+\hat{P}_{noise})-\hat{P}_{signal}$.

At 220, a comparison is made between the estimated signal power and some constant multiple X of the interference-plus-noise power. For example, X may be 10. When it is determined that the signal power is substantially greater than the interference-plus-noise power (using the comparison test at 220), then the interference-plus-noise power is recalculated with a more stable algorithm at 222. Otherwise, the process continues to 224.

The more stable algorithm for computing the interference-plus-noise power is now described. The quantity Q is defined to represent a portion of the computation at 218, where $Q=\tilde{R}(1:x-1)\oplus conj(\tilde{R}(2:x))$. In addition, the quantities $U_1$ and $U_2$ are defined, where $U_1=$sum$(2*real(Q*conj(sum(Q)/abs(sum(Q)))))$ and $U_2=x*\hat{P}_{signal}+$sum$((abs(R(2:x-1)))^2)$ The interference-plus-noise power is recomputed as $\hat{P}_{noise}=abs(U_2-U_1)/(2*x-2)$. The algorithm employed at 222 to compute the interference-plus-noise power is more stable, meaning it has less variation with channel conditions.

If the path is taken from 220 to 222 to use the first more stable algorithm to compute the interference-plus-noise power, then it is this quantity that is use in remainder of the PCINR computation process 200.

At 224, a determination is made as to the number of frames that have been observed based on some programmable parameter p, where p>1. If a sufficient number of frames have been observed from which the signal power and interference-plus-noise power have been computed, then the process proceeds to 228. Otherwise, the process proceeds to 226 to repeat the functions of 210-222 for the next frame as indicated at 226.

At 228, the mean PCINR is computed over p+1 frames, where $\hat{\mu}_{CINR,dB}(k)$ is as described above. At 230, the mean PCINR is compared with a programmable threshold (e.g., 10 dB but perhaps as low as 2-5 dB depending on the environment) and if it exceeds the threshold, then at 232 a different algorithm is used to recompute $\hat{\mu}_{CINR,dB}(k)$ and then to compute PCINR from received signals in multiple frames. Otherwise, PCINR at 234 is computed at 234 from the signal power and interference-plus-noise power (with values for those quantities which have been computed up to this point).

A determination at 230 that the mean PCINR exceeds the threshold is indicative of possibility/necessary of recalculating/updating the value of mean PCINR due to possible high Doppler frequency effect or a significant amount of channel variation which is common in urban areas. In these conditions, the estimated PCINR values computed from the signal power and interference plus noise power quantities may under-estimate the actual PCINR in the system. Accordingly, the following computations may be made to obtain a more accurate estimate of the PCINR.

A quantity V is defined for a given frame k as $V(k)=$sum$(abs(Q_k(1:x-1)-Q_k(2:x)))/(x-2)/\hat{P}_{signal}$, where $Q_k$ is the quantity Q as described above in connection with the more stable algorithm at 222, for frame k. A quantity w is computed from the quantity V as $w=-\ln(std(V))$. Next the quantity w is compared with a threshold as follows:

If $w>a_{threshold}$, compute $\psi_{CINR,dB}(k)=(w-c_1)*c_2+c_3$. Then the comparison $\psi_{CINR,dB}(k)>\hat{\mu}_{CINR,dB}(k)+e_1$ is made and in which case $\hat{\mu}_{CINR,dB}(k)=\psi_{CINR,dB}(k)$.

Another method involves computing the quantity w as $w=-\log_2(std(V))$. In this case, the quantity w is compared with a threshold as follows:

If $w>b_{threshold}$, $\psi_{CINR,dB}(k)=(w-d_1)*d_2+d_3$. Then the comparison $\psi_{CINR,dB}(k)>\hat{\mu}_{CINR,dB}(k)+e_1$ is made and in which case $\hat{\mu}_{CINR,dB}(k)=\psi_{CINR,dB}(k)$.

The $\hat{\mu}_{CINR,dB}(k)$ quantity may serve as an updated/average mean PCINR value or an instantaneous estimated PCINR value. Then, after the recomputed estimate of $\hat{\mu}_{CINR,dB}(k)$ is made, an update is made from the expression:

$$\hat{\mu}_{CINR}(k) = \begin{cases} \overline{CINR}(0) & k=0 \\ (1-\alpha_{avg})\hat{\mu}_{CINR}(k-1)+\alpha_{avg}\overline{CINR}(k) & k>0 \end{cases}$$

to compute the PCINR from received signals over multiple frames k.

The computations at 214-224 assume that the channel is relatively static and thus the interference-plus-noise power and signal power do not change over time/frequency slots.

However, when there are channel variations caused by multipath or Doppler effects, the signal power and interference-plus-noise power, and particularly the signal power will vary over time and frequency. Thus, the computation at 232 detects and compensates for the effects of Doppler and large multipath to obtain accurate PCINR estimation values under those conditions.

Figure 6:
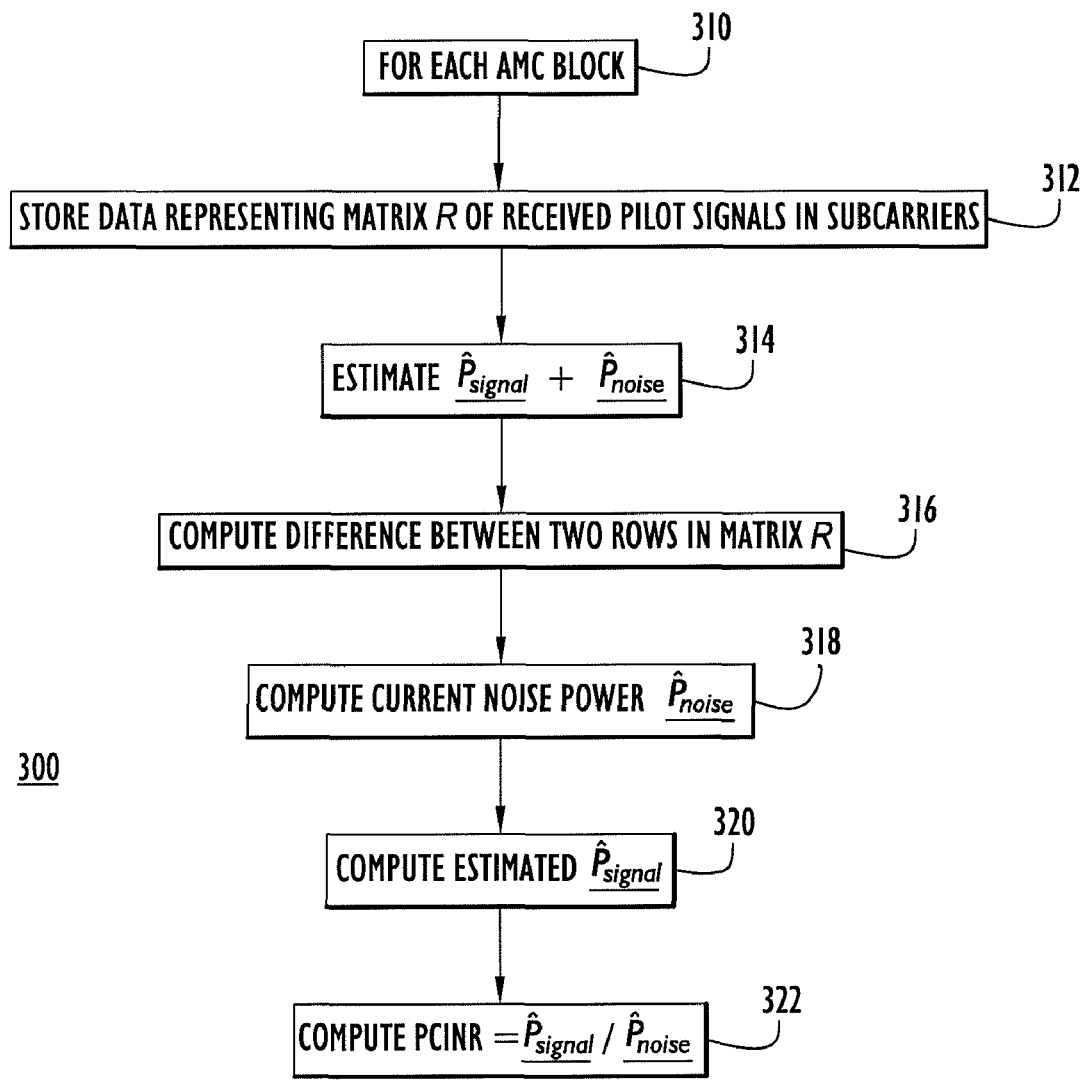
FIG. 6 is an example of a flow chart depicting a process for computing the physical carrier to interference-plus-noise ratio based on pilot signals contained in received data transmissions.

Turning to FIG. 6, a process 300 is shown for computing PCINR based on pilot signals contained in data frames transmitted between wireless communication devices. The process 300 is applicable to a block of subcarriers that are used for uplink (UL) or downlink (DL) transmissions that use the Adaptive Modulation and Coding (AMC) scheme in the IEEE 802.16 communication standard.

In the IEEE 802.16 communication standard, in the uplink PUSC mode the available subcarrier space is split into tiles. Six tiles, chosen from across the entire spectrum by means of a re-arranging/permutation scheme, are grouped together to form a slot. The slot comprises 48 data subcarriers and 24 pilot subcarriers in 3 OFDM symbols.

The contiguous permutations are used for DL and UL transmissions that utilize AMC. A bin consists of 9 contiguous subcarriers in a symbol, with 8 assigned for data subcarriers and one assigned for a pilot subcarrier. A slot in AMC is defined as a collection of bins of the type (N×M=6), where N is the number of contiguous bins and M is the number of contiguous symbols. The allowed combinations are [(6 bins, 1 symbol), (3 bins, 2 symbols), (2 bins, 3 symbols), (1 bin, 6 symbols)]. The AMC permutation enables multi-user diversity by choosing the sub-channel with the best frequency response.

As indicated at 310, the functions shown at reference numerals 312-322 are performed for each AMC (1×6) block (of contiguous subcarriers). At 312, data is stored representing a matrix R of received pilot signals in subcarriers, where:

$$R = \begin{bmatrix} r(1,2) & r(2,5) & r(3,8) \\ r(4,2) & r(5,5) & r(6,8) \end{bmatrix}$$

Next, at 314, an estimate of the sum quantity $(\hat{P}_{signal} + \hat{P}_{noise})$ is computed as $(\overline{\hat{P}_{signal} + \hat{P}_{noise}}) = \text{sum}(\text{sum}((\text{abs}(R))^2))/6$.

At 316, a difference between the two rows of the matrix R is computed as $\delta = R(1,:) - R(2,:)$. At 318, the current interference-plus-noise power is computed as $\overline{\hat{P}_{noise}} = \text{sum}(\text{abs}(\delta(1:2) - \delta(2:3)).\hat{}2)/8$. Those differences represent differences between received pilot signals in adjacent subcarriers (in frequency and time) and are used to remove/reduce the effects of high/low Doppler frequency effects and high/low channel information variations as well as effects of timing estimation errors. At 320, an estimate of the signal power is computed from the relationship $\hat{P}_{signal} = (\overline{\hat{P}_{signal} + \hat{P}_{noise}}) - \overline{\hat{P}_{noise}}$. Finally, at 322, the PCINR is computed from $\overline{\hat{P}_{signal}}$ and $\overline{\hat{P}_{noise}}$.

An MS may compute the PCINR for each AMC block and transmit the PCINR to the BS. The BS may use the PCINR values for scheduling and to assign transmissions to the AMC block that has a higher PCINR. The BS may also compute a PCINR value for AMC blocks or PUSC blocks that it receives in UL transmissions from a MS.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. For example, the process 200 may be employed for AMC (2×3) block transmission, or band AMC estimation, for example, and the process 300 may be employed for uplink PUSC transmission. Accordingly, it is appropriate that the appended claims be construed broadly and in a manner consistent with the scope of the apparatus, system, and method, as set forth in the following claims.

What is claimed is:

1. A method comprising:
   receiving wireless transmission frames;
   for each frame:
      storing data representing a first vector of received signals in active subcarriers;
      detecting a preamble;
      storing, based on the detected preamble, data representing a second vector for a pseudo-noise code in the active subcarriers;
      computing an estimate of a sum of signal power and interference-plus-noise power from the first and second vectors;
      computing an estimate of the signal power from the first and second vectors; and
      computing an estimate of the interference-plus-noise power from the sum and the estimate of the signal power;
   computing a physical carrier to interference-plus-noise ratio from the estimate of the signal power and the estimate of the interference-plus-noise power; and
   adjusting a system parameter associated with wireless communication between wireless communication devices based on the physical carrier to interference-plus-noise ratio.

2. The method of claim 1, and further comprising, for each frame, computing a dot product of the first and second vectors, and wherein computing the estimate of the sum of the signal power and the interference-plus-noise power is based on the dot product, and wherein computing the estimate of the signal power is based on the dot product.

3. The method of claim 1, for each frame, further comprising comparing the estimate of the signal power with the estimate of the interference-plus-noise power to determine whether the estimate of the signal power is substantially greater than the estimate of the interference-plus-noise power.

4. The method of claim 3, wherein for each frame, when it is determined that the estimate of the signal power is substantially greater than the estimate of the interference-plus-noise power, computing a more stable estimate of the interference-plus-noise power, and wherein computing the physical carrier to interference-plus-noise ratio is based on the more stable estimate of the interference-plus-noise power.

5. The method of claim 1, and further comprising computing a mean of the physical carrier to interference-plus-noise ratio for a plurality of frames, and determining whether the mean is greater than a threshold.

6. The method of claim 5, wherein when it is determined that the mean is greater than the threshold, computing the physical carrier to interference-plus-noise ratio from a mean of the physical carrier to interference-plus-noise ratio and from received signals in multiple frames.

7. An apparatus comprising:
   a receiver that is configured to receive wireless transmission frames;

a controller coupled to the receiver, wherein the controller is configured to:
  for each frame:
    store data representing a first vector of received signals in active subcarriers;
    detect a preamble;
    store, based on the detected preamble, data representing a second vector for a pseudo-noise code in the active subcarriers;
    compute an estimate of a sum of signal power and interference-plus-noise power from the first and second vectors;
    compute an estimate of the signal power from the first and second vectors;
    compute an estimate of the interference-plus-noise power from the sum and the estimate of the signal power;
  compute a physical carrier to interference-plus-noise ratio from the estimate of the signal power and the estimate of the interference-plus-noise power.

8. The apparatus of claim 7, and further comprising a transmitter that is coupled to the controller and configured to transmit a signal that contains data representing the physical carrier to interference-plus-noise ratio to another apparatus.

9. The apparatus of claim 7, wherein the controller is further configured to adjust a system parameter associated with wireless communication with another apparatus based on the physical carrier to interference-plus-noise ratio.

10. The apparatus of claim 7, wherein the controller is configured to, for each frame, compute a dot product of the vectors R and C, compute the estimate of the sum of the signal power and the interference-plus-noise power based on the dot product, and compute the estimate of the signal power is based on the dot product, wherein R is the first vector and C is the second vector.

11. The apparatus of claim 10, wherein the controller is configured to, for each frame, compare the estimate of the signal power with the estimate of the interference-plus-noise power to determine whether the estimate of the signal power is substantially greater than the estimate of the interference-plus-noise power.

12. The apparatus of claim 11, wherein the controller is configured to, for each frame, compute a more stable estimate of the interference-plus-noise power when it is determined that the estimate of the signal power is substantially greater than the estimate of the interference-plus-noise power, and compute the physical carrier to interference-plus-noise ratio based on the more stable estimate of the interference-plus-noise power.

13. The apparatus of claim 7, wherein the controller is further configured to compute a mean of the physical carrier to interference-plus-noise ratio for a plurality of frames, determine whether the mean is greater than a threshold, and compute the physical carrier to interference-plus-noise ratio from a mean of the physical carrier to interference-plus-noise ratio and from received signals in multiple frames.

14. One or more non-transitory computer readable storage media encoded with software comprising computer executable instructions and when the software is executed by a processor operable to:
  for each received frame of a wireless transmission:
    store data representing a first vector of received signals in active subcarriers;
    detect a preamble;
    store, based on the detected preamble, data representing a second vector for a pseudo-noise code in the active subcarriers;
    compute an estimate of a sum of signal power and interference-plus-noise power from the first and second vectors;
    compute an estimate of the signal power from the first and second vectors; and
    compute an estimate of the interference-plus-noise power from the sum and the estimate of the signal power;
  compute a physical carrier to interference-plus-noise ratio from the estimate of the signal power and the estimate of the interference-plus-noise power; and
  adjust a system parameter associated with wireless communication between wireless communication devices based on the physical carrier to interference-plus-noise ratio.

15. The computer readable storage media of claim 14, and further comprising instructions operable to, for each frame, compute a dot product of the first and second vectors, and wherein the instructions that compute the estimate of the sum is based on the dot product, and the instructions that compute the estimate of the signal power is based on the dot product.

16. The computer readable storage media of claim 14, and further comprising instructions operable to, for each frame, compare the estimate of the signal power with the estimate of the interference-plus-noise power to determine whether the estimate of the signal power is substantially greater than the estimate of the interference-plus-noise power, and instructions operable to compute a more stable estimate of the interference-plus-noise power when it is determined that the estimate of the signal power is substantially greater than the estimate of the interference-plus-noise power, and wherein the instructions operable to compute the physical carrier to interference-plus-noise ratio is based on the more stable estimate of the interference-plus-noise power.

17. A method comprising:
  receiving wireless transmissions that include pilot signals in subcarriers;
  for each block of contiguous subcarriers in a symbol:
    storing data for a matrix representing received pilot signals in subcarriers;
    computing an estimate of a sum of estimated signal power and estimated interference-plus-noise power from the received pilot signals;
    computing a difference between two rows in the matrix representing received pilot signals in adjacent subcarriers;
    computing an estimate of the interference-plus-noise power from the difference;
    computing an estimate of the signal power from the sum and the estimate of the interference-plus-noise power;
  computing a physical carrier to interference-plus-noise ratio from the estimate of the signal power and the estimate of the interference-plus-noise power;
  adjusting a system parameter associated with wireless communication between wireless communication devices based on the physical carrier to interference-plus-noise ratio.

18. The method of claim 17, wherein storing data for a matrix representing received pilot signals in subcarriers comprises:
  storing data for a matrix having two rows and three columns.

19. The method of claim 17, further comprising:
  computing the physical carrier to interference-plus-noise for each block at a mobile station; and
  transmitting the physical carrier to interference-plus-noise for each block from the mobile station to a base station.

20. The method of claim 19, wherein adjusting a system parameter associated with wireless communication between wireless communication devices based on the physical carrier to interference-plus-noise ratio comprises:
- at the base station, scheduling and assigning transmissions to a block of contiguous subcarriers based on the physical carrier to interference-plus-noise ratio received from the mobile station.

21. One or more non-transitory computer readable storage media encoded with software comprising computer executable instructions and when the software is executed by a processor operable to:
- for each block of contiguous subcarriers in a symbol contained in a wireless transmission:
  - store data representing a matrix of received pilot signals in subcarriers;
  - compute an estimate of a sum of estimated signal power and estimated interference-plus-noise power from the received pilot signals;
  - compute a difference between two rows in the matrix representing received pilot signals in adjacent subcarriers;
  - compute an estimate of the interference-plus-noise power from the difference;
  - compute an estimate of the signal power from the sum and the estimate of the estimate of the interference-plus-noise power;
- compute a physical carrier to interference-plus-noise ratio from the estimate of the signal power and the estimate of the interference-plus-noise power;
- adjust a system parameter associated with wireless communication between wireless communication devices based on the physical carrier to interference-plus-noise ratio.

22. The computer readable storage media of claim 21, wherein the instructions operable to store data for a matrix representing received pilot signals in subcarriers comprise instructions operable to:
- store data for a matrix having two rows and three columns.

23. The computer readable storage media of claim 21, further comprising instructions operable to:
- compute the physical carrier to interference-plus-noise for each block at a mobile station; and
- transmit the physical carrier to interference-plus-noise for each block from the mobile station to a base station.

24. The computer readable storage media of claim 23, wherein the instructions operable to adjust a system parameter associated with wireless communication between wireless communication devices based on the physical carrier to interference-plus-noise ratio comprise instructions operable to:
- at the base station, schedule and assign transmissions to a block of contiguous subcarriers based on the physical carrier to interference-plus-noise ratio received from the mobile station.

* * * * *